(12) United States Patent
Hu et al.

(10) Patent No.: US 11,870,735 B2
(45) Date of Patent: Jan. 9, 2024

(54) SIMPLIFICATION FOR DISTRIBUTED-TONE RESOURCE UNITS IN 6GHZ LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 149 days.

(21) Appl. No.: 17/386,343

(22) Filed: Jul. 27, 2021

(65) Prior Publication Data

US 2022/0038250 A1     Feb. 3, 2022

Related U.S. Application Data

(60) Provisional application No. 63/090,304, filed on Oct. 12, 2020, provisional application No. 63/057,321, filed on Jul. 28, 2020.

(51) Int. Cl.
| | | |
|---|---|---|
| *H04L 5/00* | (2006.01) | |
| *H04L 27/26* | (2006.01) | |
| *H04W 72/0453* | (2023.01) | |

(52) U.S. Cl.
CPC ...... *H04L 5/0098* (2013.01); *H04L 27/26025* (2021.01); *H04W 72/0453* (2013.01)

(58) Field of Classification Search
CPC . H04L 27/26025; H04L 5/0023; H04L 41/08; H04L 27/2636; H04L 5/0007; H04L 5/0042; H04L 27/2614; H04W 72/0453; H04W 72/12; G01R 31/2822; H04B 7/0452
See application file for complete search history.

(56) References Cited

U.S. PATENT DOCUMENTS

| | | | |
|---|---|---|---|
| 2009/0285168 A1* | 11/2009 | Choi | H04L 5/0042 370/329 |
| 2010/0284482 A1* | 11/2010 | Cudak | H04L 5/0023 375/261 |

(Continued)

FOREIGN PATENT DOCUMENTS

| | | | | |
|---|---|---|---|---|
| CN | 107079431 A | * | 8/2017 | ........... H04L 5/0007 |
| CN | 107113140 A | * | 8/2017 | ........... H04B 7/0413 |

(Continued)

OTHER PUBLICATIONS

Spectrum Sharing Between WLANs and Fixed Microwave Links in 6 and 13 GHz bands: a Case Study, IEEE, 2019 (Year: 2019).*

(Continued)

*Primary Examiner* — Ayaz R Sheikh
*Assistant Examiner* — Louis Samara

(57) ABSTRACT

Various schemes pertaining to design simplification for distributed-tone resource units (RUs) in 6 GHz low-power indoor (LPI) systems are described. A communication entity performs tone distribution with a logical RU size over a bandwidth to generate a distributed-tone RU. The communication entity then communicates wirelessly using the distributed-tone RU in a 6 GHz low-power indoor (LPI) system.

20 Claims, 18 Drawing Sheets

(56) References Cited

U.S. PATENT DOCUMENTS

| | | | |
|---|---|---|---|
| 2012/0169359 A1* | 7/2012 | Kim | G01R 31/2822 |
| | | | 324/750.01 |
| 2016/0330300 A1 | 11/2016 | Josiam et al. | |
| 2017/0064718 A1* | 3/2017 | Bharadwaj | H04B 7/0452 |
| 2017/0181136 A1* | 6/2017 | Bharadwaj | H04W 72/12 |
| 2020/0008185 A1 | 1/2020 | Chen et al. | |
| 2020/0014509 A1* | 1/2020 | Asterjadhi | H04L 5/0041 |
| 2021/0044981 A1* | 2/2021 | Bhattad | H04J 13/18 |
| 2022/0294558 A1* | 9/2022 | Park | H04L 5/0044 |

FOREIGN PATENT DOCUMENTS

| | | | | |
|---|---|---|---|---|
| CN | 107113140 A | | 8/2017 | |
| CN | 113891460 A | * | 1/2022 | |
| CN | 115298997 A | * | 11/2022 | H04L 5/0007 |
| EP | 3945693 A1 | * | 2/2022 | H04L 27/26025 |
| SG | 10201907069P A | * | 7/2019 | H04W 72/541 |
| TW | 202027532 A | | 7/2020 | |
| WO | WO-2017143818 A1 | * | 8/2017 | H04W 72/12 |
| WO | WO-2020228654 A1 | * | 11/2020 | H04L 27/2614 |
| WO | WO-2022033450 A1 | * | 2/2022 | H04L 27/2615 |

OTHER PUBLICATIONS

Federal Register, vol. 85 No. 101, May 26, 2020 (Year: 2020).*
European Patent Office, Extended European Search Report for European Patent Application No. 21188219.6, dated Dec. 14, 2021.
Taiwan Intellectual Property Office, Office Action for Taiwan Patent Application No. 110127735, dated Nov. 18, 2022.

* cited by examiner

| LOGICAL RU/MRU | DISTRIBUTING BANDWIDTH | | |
|---|---|---|---|
| | 20MHZ | 40MHZ | 80MHZ |
| RU26 | 2 | 1 | 1 |
| RU52 | 3 | 2 | 1 |
| MRU78 (26+52) | 5 | 3 | 2 |
| RU106 | 6 | 3 | 2 |
| MRU132 (26+106) | 8 | 4 | 2 |
| RU242 | N/A | 7 | 4 |
| RU484 | N/A | N/A | 7 |
| RU996 | N/A | N/A | N/A |

FIG. 2

| LOGICAL RU/MRU | DISTRIBUTING BANDWIDTH | | | | |
|---|---|---|---|---|---|
| | 20MHZ | 40MHZ | 80MHZ | 160MHZ | 320MHZ |
| RU26 | 2 | 1 | 1 | 1 | 1 |
| RU52 | 3 | 2 | 1 | 1 | 1 |
| MRU78 (26+52) | 5 | 3 | 2 | 1 | 1 |
| RU106 | 6 | 3 | 2 | 1 | 1 |
| MRU132 (26+106) | 8 | 4 | 2 | 1 | 1 |
| RU242 | N/A | 7 | 4 | 2 | 1 |
| RU484 | N/A | N/A | 7 | 4 | 2 |
| RU996 | N/A | N/A | N/A | 7 | 4 |

FIG. 3

| RU Size (# of Tones) | BANDWIDTH (MHz) | | | | | |
|---|---|---|---|---|---|---|
| | 20 | 40 | 80 | 160 | 320 | |
| 26 | 9 | 18 | 36 | 72 | 144 | |
| 52 | 4 | 8 | 16 | 32 | 64 | |
| 106 | 2 | 4 | 8 | 16 | 32 | |
| 242 | 1 | 2 | 4 | 8 | 16 | |
| 484 | N/A | 1 | 2 | 4 | 8 | |
| 996 | N/A | N/A | 1 | 2 | 4 | |

| RU Size (# of tones) | $RU_{START}$ | $\{l_i\}$ |
|---|---|---|
| 26 | {0 4 2 6 1 5 3 7} | {0} |
| 52 | {0 2 1 3} | {0 4} |
| 106 | {0 1} | {0 2 4 6} |

(B)

BW40 — $N_p = 16$

| RU Size (# of tones) | $RU_{START}$ | $\{l_i\}$ |
|---|---|---|
| 26 | {0 8 4 12 2 10 6 14 1 9 5 13 3 11 7 15} | {0} |
| 52 | {0 4 2 6 1 5 3 7} | {0 8} |
| 106 | {0 2 1 3} | {0 4 8 12} |
| 242 | {0 1} | {0 2 4 6 8 10 12 14} |

| RU SIZE (# OF TONES) | $RU_{START}$ | $\{l_i\}$ |
|---|---|---|
| 52 | {0 8 4 12 6 14 2 10 1 9 5 13 7 15 3 11} | {0} |
| 106 | {0 4 6 2 1 5 7 3} | {0 8} |
| 242 | {0 2 1 3} | {0 4 8 12} |
| 484 | {0 1} | {0:2:15} |

(A)

BW80 $N_p = 32$

| RU SIZE (# OF TONES) | $RU_{START}$ | $\{l_i\}$ |
|---|---|---|
| 26 | {0 16 8 24 4 20 12 28 2 18 10 26 6 22 14 30 1 17 9 25 5 21 13 29 3 19 11 27 7 23 15 31} | {0} |
| 52 | {0 8 4 12 2 10 6 14 1 9 5 13 3 11 7 15} | {0 16} |
| 106 | {0 4 2 6 1 5 3 7} | {0 8 16 24} |
| 242 | {0 2 1 3} | {0:4:28} |
| 484 | {0 1} | {0:2:28} |

| RU SIZE (# OF TONES) | $RU_{START}$ | $N_p = 16, v = [0\ 1008]$ $\{I_i\}$ |
|---|---|---|
| 52 | {v v+8 v+4 v+12 v+10 v+6 v+14 v+1 v+9 v+5 v+13 v+3 v+11 v+7 v+15} | {0} |
| 106 | {0 8 4 12 2 10 6 14 1 9 5 13 3 11 7 15} | {0} |
| 242 | | {0 8} |
| 484 | {0 4 2 6 1 5 3 7} | {0 4 8 12} |
| 996 | {0 2 1 3} | {0:2:14} |

(B)

BW320

| RU SIZE (# OF TONES) | $RU_{START}$ | $N_p = 16, v = [0\ 2000]$ $\{I_i\}$ |
|---|---|---|
| 106 | {v v+8 v+4 v+12 v+1 v+9 v+5 v+13 v+2 v+10 v+6 v+14 v+3 v+11 v+7 v+15} | {0} |
| 242 | {0 8 4 12 1 9 5 13 2 10 6 14 3 11 7 15} | {0} |
| 484 | | {0 8} |
| 996 | {0 4 1 5 2 6 3 7} | {0 4 8 12} |

| RU SIZE (# OF TONES) | $RU_{START}$ | $\{I_i\}$ |
|---|---|---|
| 26 | {v v+1} | {0} |
| 52 | {0 8 4 12 6 14 2 10 1 9 5 13 7 15 3 11} | {0 16} |
| 106 | {0 4 6 2 1 5 7 3} | {0 8 16 24} |
| 242 | {0 2 1 3} | {0:4:32} |
| 484 | {0 1} | {0:2:34} |

| RU Size (# of Tones) | $RU_{START}$ | $\{l_i\}$ |
|---|---|---|
| 26 | {v v+8 0 v+4 v+12 v+6 v+14 2 v+10 v+1 v+9 1 v+5 v+13 v+7 v+15 3 v+3 v+11} | {0 16}* |
| 52 | {0 8 4 12 6 14 2 10 1 9 5 13 7 15 3 11} | {0 16} |
| 106 | {0 4 6 2 1 5 7 3} | {0 8 16 24} |
| 242 | {0 2 1 3} | {0:4:32} |
| 484 | {0 1} | {0:2:34} |

$N_p = 37$, $v = [0\ 48 1]$

* Note: FOR MIDDLE RU26 WITH INDEX $r = 5, 14, 23, 32$, $\{l_i\} = \{32\}$

FIG. 10A

| BW80 RU Size (# of Tones) | $RU_{START}$ | $\{l_i\}$ | $N_p = 36$ |
|---|---|---|---|
| 26 | {0 13 26 3 16 29 6 19 32 9 22 35 12 25 2 15 28 5 18 31 8 21 34 11 24 1 14 27 4 17 30 7 20 33 10 23} | {0} | |
| 52 | {0 3 6 19 9 12 2 5 18 8 11 1 4 17 20 10} | {0 13} FOR DRU1, 4, 5, 7, 9, 10, 11, 12, 14, 15, 16 {0 23} FOR DRU2, 3, 6, 8, 13 | |
| 106 | {0 6 9 2 8 1 4 10} | {0 13} FOR DRU1, 3, 4 {0 13 23 26} FOR DRU2, 7 {0 10 13 23} FOR DRU5, 6, 8 | |
| 242 | {0 2 1 4} | {0 3 6 13 16 19 26 29 32} FOR DRU1 {0 3 7 10 13 20 23 26 33} FOR DRU2 {0 7 10 13 17 20 23 30 33} FOR DRU3 {0 3 6 13 16 19 23 26 29} FOR DRU4 | |
| 484 | {0 1} | {0 2 3 5 6 9 12 13 15 16 19 22 25 26 28 29 32 35} FOR DRU1 {0 3 6 7 9 10 13 16 17 19 20 22 23 26 29 30 32 33} FOR DRU2 | |

| RU Size (# of Tones) | $RU_{START}$ | $\{l_i\}$ |
|---|---|---|
| 26 | {v v+1} | {0} |
| 52 | {0 8 4 12 6 14 2 10 1 9 5 13 7 15 3 11} | {0 16} |
| 106 | {0 4 6 2 1 5 7 3} | {0 8 16 24} |
| 242 | {0 2 1 3} | {0 4 32} |
| 484 | {0 1} | {0 2 34} |

| BW80 | | |
|---|---|---|
| RU Size (# of Tones) | $RU_{START}$ | $\{l_i\}$ |
| 26 | {v v+1} | {0} |
| 52 | {0 9 5 14 2 11 7 16 1 10 6 15 3 12 8 17} | |
| 106 | {0 5 2 7 1 6 3 8} | {0 18} |
| 242 | {0 2 1 3} | {0:9:27} |
| 484 | {0 1} | {0:9:27 5:9:32 4} FOR dRU1<br>{0:9:27 5:9:32 20} FOR dRU2<br>{0:9:27 5:9:32 12} FOR dRU3<br>{0:9:27 5:9:32 28} FOR dRU4 |
| | | {0 2 4 5 7 9 11 14 16 18 20 22 23 25 27 29 32 34} FOR dRU1<br>{0 2 4 7 9 11 12 14 16 18 20 23 25 27 29 30 32 34} FOR dRU2 |

| RU SIZE (# OF TONES) | $RU_{START}$ | $\{l_i\}$ |
|---|---|---|
| 26 | {v0 0 v0+4 v0+12 8 v0+8 v0+2 2 v0+6 v0+14 10 v0+1 v0+5 v0+9 v0+13 9 v0+9 v0+3 3 v0+7 v0+15 11 v0+11} | {0 16 32 48}* |
| 52 | {v1 v1+4 v1+12 v1+8 v1+2 v1+6 v1+14 v1+10 v1+1 v1+5 v1+13 v1+9 v+3 v1+7 v1+15 v1+11} | {0 16 32 48}* |
| 106 | {0 4 12 8 2 6 14 10 1 5 13 9 3 7 15 11} | {0 16 32 48}* |
| 242 | {0 8 2 10 1 9 3 11} | {0 4 16 20 32 36 48 52 61}* |
| 484 | {0 2 1 3} | {0:4:56 61 65 69} |
| 996 | {0 0} | {0:2:58 60 61:2:71}* |

$N_p = 74, v0 = [0\ 476\ 962\ 1438], v1 = [0\ 962]$

* NOTE 1: FOR MIDDLE RU26 WITH INDEX $r$ = 5, 14, 23, 32, 41, 50, 59, 68, $\{l_i\}$ = {61};
* NOTE 2: FOR RU26 WITH INDEX $r$ = 10, 12, 28, 30, 46, 48, 64, 66, $\{l_i\}$ = {0, 16, 32, 53};
* NOTE 3: FOR RU26 WITH INDEX $r$ = 11, 13, 47, 49, 29, 31, 65, 67, $\{l_i\}$ = {0, 21, 42, 58};
* NOTE 4: FOR RU26 WITH INDEX $r$ = 2, 4, 38, 40, 20, 22, 56, 58, 7, 9, 43, 45, 25, 27, 61, 63, 16, 18, 52, 54, 34, 36, 70, 72, $\{l_i\}$ = {0, 16, 42, 58};
* NOTE 5: FOR RU52 WITH INDEX $r$ = 5, 6, 13, 14, 21, 22, 29, 30, $\{l_i\}$ = {0, 16, 32, 53};
* NOTE 6: FOR RU106 WITH INDEX $r$ = 3, 7, 11, 15, $\{l_i\}$ = {0, 16, 32, 53};
* NOTE 7: FOR RU242 WITH INDEX $r$ = 2, 4, 6, 8, $\{l_i\}$ = {0, 4, 16, 20, 32, 36, 48, 57, 61};
* NOTE 8: FOR RU996 WITH INDEX $r$ = 2, $\{l_i\}$ = {1:2:59, 62:2:72, 73}

FIG. 11

| BW320 | | |
|---|---|---|
| RU Size (# of tones) | $RU_{START}$ | $\{l_i\}$ |
| 26 | {v0 v0+8 v0+4 v0+12 v0+1 v0+9 v0+5 v0+13 v0+2 v0+10 v0+6 v0+14 v0+3 v0+11 v0+7 v0+15} | {0} |
| 52 | {v1 v1+8 v1+4 v1+12 v1+1 v1+9 v1+5 v1+13 v1+2 v1+10 v1+6 v1+14 v1+3 v1+11 v1+7 v2+15} | {0} |
| 106 | {v2 v2+8 v2+4 v2+12 v2+1 v2+9 v2+5 v2+13 v2+2 v2+10 v2+6 v2+14 v2+3 v2+11 v2+7 v2+15} | {0} |
| 242 | {0 8 4 12 1 9 5 13 2 10 6 14 3 11 7 15} | {0} |
| 484 | {0 4 1 5 2 6 3 7} | {0 8} |
| 996 | {0 1 2 3} | {0 4 8 12} |

| RU Size (# of Tones) | BW20 | | | BW40 | | | BW80 | | |
|---|---|---|---|---|---|---|---|---|---|
| | $D_{td}$ | $N_{psf}$ | $N_{tsf}$ | $D_{td}$ | $N_{psf}$ | $N_{tsf}$ | $D_{td}$ | $N_{psf}$ | $N_{tsf}$ |
| 26 | 9 | 26 | 1 | 18 | 26 | 1 | 37 | 26 | 1 |
| 52 | 4 | 2 | 1 | 9 | 52 | 1 | 16 | 2 | 5 |
| 106 | 2 | 4 | 1 | 4 | 2 | 1 | 8 | 4 | 5 |
| 242 | N/A | N/A | N/A | N/A | N/A | N/A | 4 | 9 | 1 |

FIG. 13

SIMPLIFICATION FOR DISTRIBUTED-TONE RESOURCE UNITS IN 6GHZ LOW-POWER INDOOR SYSTEMS

CROSS REFERENCE TO RELATED PATENT APPLICATION

The present disclosure is part of a non-provisional patent application claiming the priority benefit of U.S. Provisional Patent Application Nos. 63/057,321 and 63/090,304, filed 28 Jul. 2020 and 12 Oct. 2020, respectively, the contents of which being incorporated by reference in their entirety.

TECHNICAL FIELD

The present disclosure is generally related to wireless communications and, more particularly, to design simplification for distributed-tone resource units (dRUs) in 6 GHz low-power indoor (LPI) systems.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4-GHz and 5-GHz bands, the equivalent isotropically radiated power (EIRP) of a power spectral density (PSD) limit is capped at 20 dBm for 2-MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6-GHz low-power indoor (LPI) applications is far more stringent than PSD requirement regarding the 2.4-GHz and 5-GHz bands. For instance, the EIRP limit is at 5 dBm/MHz for an access point (AP) in 6-GHz LPI versus the EIRP limit of 17 dBm/MHz for APs in the 5-GHz band. Similarly, the EIRP limit is at −1 dBm/MHz for an non-AP in 6-GHz LPI versus the EIRP limit of 11 dBm/MHz for APs in the 5-GHz band. Accordingly, several distributed-tone RU design methods have been proposed intending to increase the Tx power and improve the coverage range for 6 GHz LPI systems. However, as conventional distributed-tone RU designs tend to be complex, there is a need for a solution for design simplification for distributed-tone RUs in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to design simplification for distributed-tone RUs in 6 GHz LPI systems. Under one proposed scheme in accordance with the present disclosure, distributed-tone RUs may be generated from a "base tone set" with a shift. Under another proposed scheme in accordance with the present disclosure, the distributed-tone RUs may be generated by using a unified formula with the parameters given by the logical RU size and distribution bandwidth. Under yet another proposed scheme in accordance with the present disclosure, the logical RU size for tone distribution may be limited. Under yet another proposed scheme in accordance with the present disclosure, the bandwidth in which tone distribution is applied may be limited. Thus, it is believed that aforementioned issue may be addressed by implementing one or more of the various schemes proposed herein.

In one aspect, a method may involve performing tone distribution with a logical RU and multi-RU (MRU) size over a bandwidth to generate a distributed-tone RU and a distributed-tone MRU. The method may also involve communicating wirelessly using the distributed-tone RU and the distributed-tone MRU in a 6 GHz LPI system.

In another aspect, an apparatus may include a transceiver configured to communicate wirelessly and a processor coupled to the transceiver. The processor may perform tone distribution with a logical RU and MRU size over a bandwidth to generate a distributed-tone RU and a distributed-tone MRU. The processor may also communicate, via the transceiver, using the distributed-tone RU and the distributed-tone MRU in a 6 GHz LPI system.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example table in accordance with an implementation of the present disclosure.

FIG. 3 is a diagram of an example table in accordance with an implementation of the present disclosure.

FIG. 4 is a diagram of an example table in accordance with an implementation of the present disclosure.

FIG. 5 is a diagram of an example scenario in accordance with an implementation of the present disclosure.

FIG. 6 is a diagram of an example scenario in accordance with an implementation of the present disclosure.

FIG. 7 is a diagram of an example scenario in accordance with an implementation of the present disclosure.

FIG. 9 is a diagram of an example scenario in accordance with an implementation of the present disclosure.

FIG. 10A is a diagram of an example scenario in accordance with an implementation of the present disclosure.

FIG. 10B is a diagram of an example scenario in accordance with an implementation of the present disclosure.

FIG. 10C is a diagram of an example scenario in accordance with an implementation of the present disclosure.

FIG. 10D is a diagram of an example scenario in accordance with an implementation of the present disclosure.

FIG. 11 is a diagram of an example scenario in accordance with an implementation of the present disclosure.

FIG. 12 is a diagram of an example scenario in accordance with an implementation of the present disclosure.

FIG. 13 is a diagram of an example scenario in accordance with an implementation of the present disclosure.

DETAILED DESCRIPTION OF PREFERRED EMBODIMENTS

Figure 1:
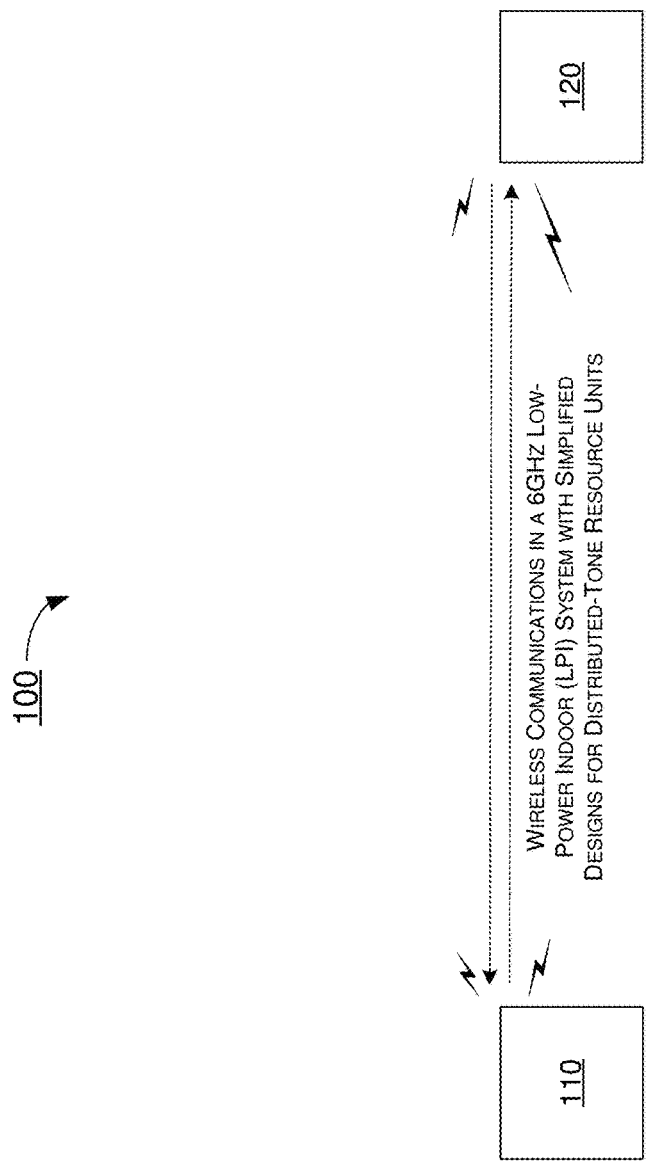
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to design simplification for distributed-tone RUs in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26, a 52-tone regular RU may be interchangeably denoted as RU52, a 106-tone regular RU may be interchangeably denoted as RU106, a 242-tone regular RU may be interchangeably denoted as RU242, and so on. Moreover, an aggregate (26+52)-tone regular MRU may be interchangeably denoted as MRU78, an aggregate (26+106)-tone regular MRU may be interchangeably denoted as MRU132, and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320.

FIG. 1 illustrates an example network environment 100 in which various solutions and schemes in accordance with the present disclosure may be implemented. FIG. 2~FIG. 15 illustrate examples of implementation of various proposed schemes in network environment 100 in accordance with the present disclosure. The following description of various proposed schemes is provided with reference to FIG. 1~FIG. 15.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA functioning an access point (AP) or a non-AP STA. Under various proposed schemes in accordance with the present disclosure, communication entity 110 and communication entity 120 may be configured to communicate wirelessly with design simplifications for distributed-tone RUs in 6 GHz LPI systems, as described herein.

Under a proposed scheme in accordance with the present disclosure, given a distribution bandwidth and a logical RU size, a distributed-tone RU (herein interchangeably denoted as interleaved RU and/or interlaced RU) may be generated from a corresponding "base tone set" simply by a shift, which may be expressed as follows:

$$K_{td} = k_{td\_base}(k) + k_{shift}(r)$$

Here, r denotes a logical RU index, r=1, 2, 3, ..., $N_{ru}$; k denotes a subcarrier index, k=0, 1, 2, ... $N_{st}$; $N_{ru}$ denotes a number of logical RUs of the given logical RU size within the given bandwidth (e.g., in BW20, $N_{ru}$=9 for RU26 and $N_{ru}$=4 for RU52); $N_{st}$ denotes a total number of subcarriers (including both data tones and pilot tones) corresponding to the logical RU size (e.g., $N_{st}$=26 for RU26, $N_{st}$=52 for RU52 and $N_{st}$=106 for RU106); $k_{td\_base}$ denotes a base tone set (vector) corresponding to a given bandwidth and a logical RU size; $k_{shift}$ denotes a shifting value (vector); and $K_{td}$ denotes a subcarrier index after tone distribution. Accordingly, adjacent tones of a logical RU (e.g., RU26 over a 2 MHz bandwidth) may be spread or otherwise distributed over a wider bandwidth (e.g., 20 MHz, 40 MHz or 80 MHz). Advantageously, multiple tones (e.g., 26 tones of RU26) may be distributed to achieve, for example, at least one tone per 1 MHz bandwidth in a distribution bandwidth.

In some cases, the base tone set $k_{td\_base}$ may be generated by (1) first performing a logical RU index r to a distributed RU mapping to result in a distributed RU index output i=π(r), and then (2) performing distributed-tone RU index generation based on i. For example, for BW20, i=(13(r−1)) mod 9+1, where r=1, 2, . . . , 9, and π( ) denotes a mapping or permutation function.

Under the proposed scheme, with respect to tone distribution over BW20 for a 26-tone distributed-tone RU (dRU26) base set, $k_{td\_base}$=[0:9:225], $k_{shift}$=[0 5 1 6 4 7 2 8 3], r=1, 2, . . . , 9. With respect to tone distribution over BW20 for a 52-tone distributed-tone RU (dRU52) base set, $k_{td\_base}$=[v, v+117], v=[0 5 9 14 18 23 27 32 36 41 45 50 54 59 63 68 72 77 81 86 90 95 99 104 108 113], $k_{shift}$=[0 1 2 3], r=1, 2, 3, 4. With respect to tone distribution over BW20 for a 106-tone distributed-tone RU (dRU106) base set, $k_{td\_base}$=[v, v+18, v+2*18, v+3*18, v+4*18, v+5*18, v+6*18, v+7*18, v+8*18, v+9*18, v+1018, v+11*18, v+12*18, 234, 235], v=[0 1 5 6 9 10 14 15], $k_{shift}$=[0 2], r=1, 2.

Under the proposed scheme, with respect to tone distribution over BW40 for a 26-tone distributed-tone RU (dRU26) base set, $k_{td\_base}$=[0:18:450], $k_{shift}$=[0 5 9 14 4 1 6 10 15 2 7 11 16 13 3 8 12 17], r=1, 2, . . . , 18. With respect to tone distribution over BW40 for a 52-tone distributed-tone RU (dRU52) base set, $k_{td\_base}$=[v, v+234], v=[0 5 18 23 36 41 54 59 72 77 90 95 108 113 126 131 144 149 162 167 180 185 198 203 216 221], $k_{shift}$=[0 9 1 10 2 11 3 12], r=1, 2, . . . , 8. With respect to tone distribution over BW40 for a 106-tone distributed-tone RU (dRU106) base set, $k_{td\_base}$=[v, v+117, v+234, v+351, 472, 480], v=[0 5 9 14 18 23 27 32 36 41 45 50 54 59 63 68 72 77 81 86 90 95 99 104 108 113], $k_{shift}$=[0 1 2 3], r=1, 2, 3, 4.

Under the proposed scheme, with respect to tone distribution over BW80 for a 26-tone distributed-tone RU (dRU26) base set, $k_{td\_base}$=[0:18:450], $k_{shift}$=[U1, U1+1, U2, U2+1], U1=[0 486 4 490 16 8 494 12 498], U2=[2 488 6 492 484 10 496 14 500], r=1, 2, . . . , 36. With respect to tone distribution over BW80 for a 52-tone distributed-tone RU (dRU52) base set, $k_{td\_base}$=[v, v+486], v=[0:18:450], $k_{shift}$=[0 4 8 12 1 5 9 13 2 6 10 14 3 7 11 15], r=1, 2, . . . , 16. With respect to tone distribution over BW80 for a 106-tone distributed-tone RU (dRU106) base set, $k_{td\_base}$=[v, v+234, v+486, v+720, 954, 958], v=[0 4 18 22 36 40 54 58 72 76 90 94 108 112 126 130 144 148 162 166 180 184 198 202 216 220], $k_{shift}$=[0 8 1 9 2 10 3 11], r=1, 2, . . . , 8. With respect to tone distribution over BW80 for a 242-tone distributed-tone RU (dRU242) base set, $k_{td\_base}$=[v1, v1+216, 432:4:448, 450:4:466, 468:4:480, v2, v2+234, 954:4:966] for r=1, 2, $k_{td\_base}$=[v2−484, v2−484+234, 470:4:482, v1+484, v1+484+21, 916:4:932, 934:4:950, 956:4:968] for r=3, 4, v1=[0:4:16 18:4:34 36:4:52 54:4:70 72:4:88 90:4:106 108:4:124 126:4:142 144:4:160 162:4:178 180:4:196 198:4:214], v2=[486:4:498 504:4:516 522:4:534 540:4:552 558:4:570 576:4:588 594:4:606 612:4:624 630:4:642 648:4:660 666:4:678 684:4:696 702:4:714], $k_{shift}$=[0 1 0 1], r=1, 2, 3, 4.

Under the proposed scheme, with respect to tone distribution over BW160 for a 26-tone distributed-tone RU (dRU26) base set, $k_{td\_base}$=[0:16:400], $k_{shift}$=[U, U+1, U+2, U+3, U+4, U+5, U+6, U+7], U=[0 484 968 1452 NaN 8 492 976 1460] with NaN indicating to skip middle RU26 in each 20 MHz, r=1, 2, . . . , 72. With respect to tone distribution over BW160 for a 52-tone distributed-tone RU (dRU52) base set, $k_{td\_base}$=[v, v+484], v=[0:16:400], $k_{shift}$=[U, U+1, U+2, U+3, U+4, U+5, U+6, U+7], U=[0 968 8 976], r=1, 2, . . . , 32. With respect to tone distribution over BW160 for a 106-tone distributed-tone RU (dRU106) base set, $k_{td\_base}$=[v, v+484, v+968, v+1452, 1868, 1884], v=[0:16:400], $k_{shift}$=[0 8 1 9 2 10 3 11 4 12 5 13 6 14 7 15], r=1, 2, . . . , 16. With respect to tone distribution over BW160 for a 242-tone distributed-tone RU (dRU242) base set, $k_{td\_base}$=[v, v+240, v+484, v+724, v+968, v+1208, v+1452, v+1692, 1932, 1940], v=[0:8:232], $k_{shift}$=[0 1 2 3 4 5 6 7], r=1, 2, . . . , 8. With respect to tone distribution over BW160 for a 484-tone distributed-tone RU (dRU484) base set, $k_{td\_base}$=[v, v+120, v+240, v+360, v+484, v+604, v+724, v+844, v+968, v+1088, v+1208, v+1328, v+1452, v+1572, v+1692, v+1812, 1932, 1933, 1940, 1941], v=[0 1 8 9 16 17 24 25 32 33 40 41 48 49 56 57 64 65 72 73 80 81 88 89 96 97 104 105 112 113], $k_{shift}$=[0 2 4 6], r=1, 2, 3, 4.

Under the proposed scheme, with respect to tone distribution over BW320 for a 26-tone distributed-tone RU (dRU26) base set, $k_{td\_base}$=[0:16:400], $k_{shift}$=[U2, U2+1, U2+2, U2+3, U2+4, U2+5, U2+6, U2+7], U2=[U1 U1+8] U1=[0 484 968 1452 NaN 1936 2420 2904 3388] with NaN indicating to skip middle RU26 in each 20 MHz, r=1, 2, . . . , 144. With respect to tone distribution over BW320 for a 52-tone distributed-tone RU (dRU52) base set, $k_{td\_base}$=[v, v+484], v=[0:16:400], $k_{shift}$=[U, U+1, U+2, U+3, U+4, U+5, U+6, U+7], U=[0 968 1936 2904 8 976 1944 2912], r=1, 2, . . . , 64. With respect to tone distribution over BW320 for a 106-tone distributed-tone RU (dRU1 06) base set, $k_{td\_base}$=[v, v+484, v+2*484, v+3*484, 1868, 1884], v=[0:16:400], $k_{shift}$=[U, U+1, U+2, U+3, U+4, U+5, U+6, U+7], U=[0 1936 8 1944], r=1, 2, . . . , 32. With respect to tone distribution over BW320 for a 242-tone distributed-tone RU (dRU242) base set, $k_{td\_base}$=[v, v+484, v+2*484, v+3*484, v+4*484, v+5*484, v+6*484, v+7*484, 3868, 3884], v=[0:16:464], $k_{shift}$=[0 8 1 9 2 10 3 11 4 12 5 13 6 14 7 15], r=1, 2, . . . , 16. With respect to tone distribution over BW320 for a 484-tone distributed-tone RU (dRU484) base set, $k_{td\_base}$=[v, v+484, v+2*484, v+3*484, v+4*484, v+5*484, v+6*484, v+7*484, 3868:8:3892], v=[0:8:472], $k_{shift}$=[0 1 2 3 4 5 6 7], r=1, 2, . . . , 8. With respect to tone distribution over BW320 for a 996-tone distributed-tone RU (dRU996) base set, $k_{td\_base}$=[v2, v2+484, v2+2*484, v2+3*484, v2+4*484, v2+5*484, v2+6*484, v2+7*484, v1(2:end)+3868, v1(1:9)+3948], v1=[0 1 8 9 16 17 24 25 32 33 40 41 48 49 56 57 64 65 72 73], v2=[v1 v1+80 v1+2*80 v1+3*80 v1+4*80 v1+5*80 480], $k_{shift}$=[0 2 4 6] except for $k_{shift}$=[0 1 2 3] when tone-index=[121 242 363 484 605 726 847 996], r=1, 2, 3, 4.

FIG. 2 illustrates an example table 200 summarizing various scenarios under a proposed scheme in accordance with the present disclosure. Referring to FIG. 2, each of the numbers shown in table 200 represent the number of tones in 1 MHz through a sliding window for a logical RU distributed over a given bandwidth (herein referred to as "distributing bandwidth" or "distribution bandwidth"). Under the proposed, a distributed-tone RU may be generated or operated in one of the various scenarios summarized in table 200. In a first scenario, the operational region is highlighted or shaded in table 200, both distributed RUs (dRUs) and distributed MRUs (dMRUs) are supported. In a second scenario, applicable logical RUs may be limited to RU26, RU52 and RU106 for distribution BW20, applicable logical RUs may be limited to RU26, RU52, RU106 and RU242 for distribution BW40, applicable logical RUs may be limited to RU26, RU52, RU106, RU242 and RU484 for distribution BW80. In a third scenario, applicable logical RUs may be limited to RU26, RU52, RU106, RU242 and RU484, and the distribution bandwidths may be limited up to BW80 (or RU996). In a fourth scenario, applicable logical RUs may be limited to RU26, RU52, RU106, RU242 and RU484, and the distribution bandwidths may be limited up to BW160 (or RU2x996). In a fifth scenario, applicable logical RUs may be limited to RU26, RU52, MRU78, RU106, MRU132, RU242 and RU484 with tone distribution applicable for BW80 (or RU996) but not applicable for other bandwidths. In a sixth scenario, applicable logical RUs may be limited to RU52, RU106, RU242 and RU484 with tone distribution applicable for BW80 (or RU996) but not applicable for other bandwidths.

FIG. 3 illustrates an example table 300 summarizing various scenarios under a proposed scheme in accordance with the present disclosure. Referring to FIG. 3, each of the numbers shown in table 300 represent the number of tones in 1 MHz through a sliding window for a logical RU distributed over a distribution bandwidth. Under the proposed, a distributed-tone RU may be operated in one of the various scenarios summarized in table 300. In a first scenario, the operational region is highlighted or shaded in table 300. In a second scenario, all logical RUs up to RU996 may be applicable, with no limitation on the distribution bandwidths up to BW320 (or RU4*996).

Under a proposed scheme in accordance with the present disclosure, given a distribution bandwidth and a logical RU size, a distributed-tone RU may be generated from a formula as follows:

$$K_{td}(k) = RU_{start}(r) + l_i + j*N_p$$

Here, $N_p$ denotes a periodicity; $l_i$ denotes a tone distribution pattern during the periodicity; $i=0, 1, 2, \ldots, L-1$; $j=0, 1, 2, \ldots,$ $$\left\lceil \frac{N_{st\_ru}}{L} \right\rceil - 1;$$

$k=0, 1, 2, \ldots, N_{st\_ru}-1$; $r=1, 2, \ldots, N_{ru}$, with r being the logical RU index. Moreover, $l_i \in \Omega_{ru} = \{l_0, l_1, \ldots, l_{L-1}\}$; $L=|\Omega_{ru}|$; $N_{st\_ru}=26, 52, 106, 242, 484, 996$ for RU26, RU52, RU106, RU242, RU484, RU996, respectively. Under the proposed scheme, $RU_{start}(r)$ represents the first or starting tone index for $dRU_r$; $l_i$ represents the tones within one repetition distance or one repetition period; $N_p$ represents the repetition distance or repetition period; L represents the number of tones within one repetition distance or one repetition period; $N_{st\_ru}$ represents the number of subcarriers for a dRU; and $N_{ru}$ represents the number of RUs for a given RU size in a given bandwidth. FIG. 4 illustrates an example table 400 summarizing the number of RUs for various RU sizes versus various bandwidths under a proposed scheme in accordance with the present disclosure.

Under a proposed scheme in accordance with the present disclosure, two design options may be undertaken. A first option (Option A) may be a simple design that may achieve perfectly uniform tone distribution and also may achieve a suboptimal or optimal power boost performance, with some limitations. A second option (Option B) may provide optimal scheduling flexibilities and may achieve an optimal power boost performance.

Under the proposed scheme, for BW20, the first option may entail supporting RU26, RU52 and RU106 without supporting other (e.g., larger) RUs or MRUs, with tones uniformly distributed to achieve optimal or suboptimal performance. For BW40, the first option may entail supporting RU26, RU52, RU106 and RU242 without supporting other (e.g., larger) RUs or MRUs, with tones uniformly distributed to achieve optimal or suboptimal performance. For BW80, the first option may entail supporting RU26, RU52, RU106, RU242 and RU484 without supporting other (e.g., larger) RUs or MRUs, with tones uniformly distributed to achieve optimal performance. For BW160, the first option may entail supporting RU52, RU106, RU242, RU484 and RU996 without supporting other RUs or MRUs, with tones uniformly distributed to achieve optimal performance. For BW320, the first option may entail supporting RU106, RU242, RU484 and RU996 without supporting other (e.g., smaller) RUs or MRUs, with tones uniformly distributed to achieve optimal performance.

FIG. 5 illustrates an example scenario 500 under the proposed scheme. Part (A) of FIG. 5 shows a summary of parameters for tone distribution design under the first option for BW20. Part (B) of FIG. 5 shows a summary of parameters for tone distribution design under the first option for BW40. FIG. 6 illustrates an example scenario 600 under the proposed scheme. Part (A) of FIG. 6 shows a summary of parameters for tone distribution design under the first option for BW80 in case of no support of 26-tone dRU. Part (B) of FIG. 6 shows a summary of parameters for tone distribution design under the first option for BW80 in case of support or no support for 26-tone dRU. FIG. 7 illustrates an example scenario 700 under the proposed scheme. Part (A) of FIG. 7 shows a summary of parameters for tone distribution design under the first option for BW160. Part (B) of FIG. 7 shows a summary of parameters for tone distribution design under the first option for BW320.

Under the proposed scheme, for BW20, the second option may entail supporting all RUs and small MRUs to achieve optimal performance. For BW40, the second option may entail supporting all RUs and small MRUs to achieve optimal performance. For BW80, the second option may entail supporting all RUs and small MRUs to achieve optimal performance. For BW160, the second option may entail supporting all RUs and small MRUs to achieve optimal performance. For BW320, the second option may entail supporting all RUs and small MRUs to achieve optimal performance. The distributed MRUs may be generated from the corresponding distributed RUs.

Figure 8:
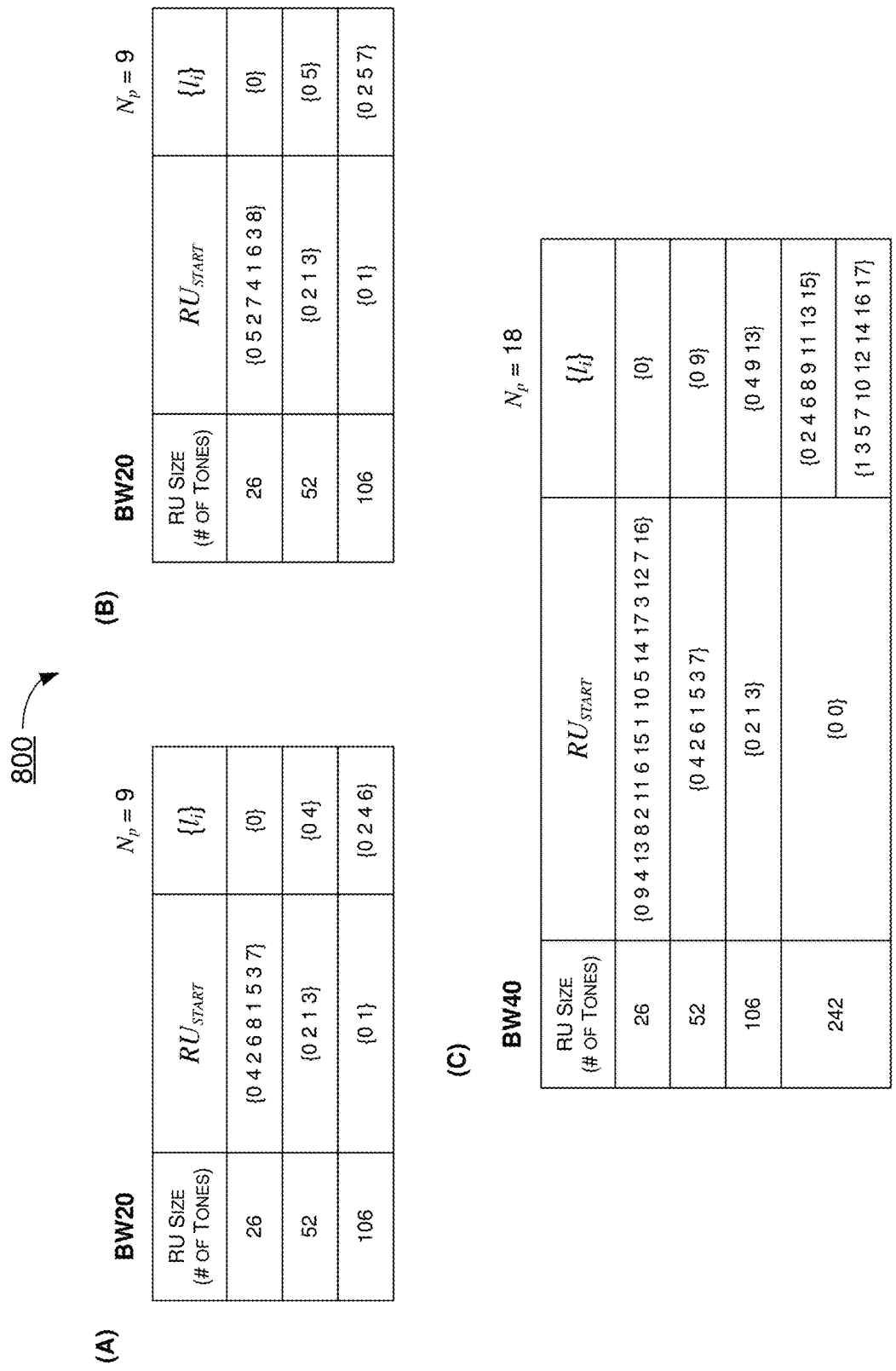
FIG. 8 is a diagram of an example scenario in accordance with an implementation of the present disclosure.

FIG. 8 illustrates an example scenario 800 under the proposed scheme. Part (A) of FIG. 8 shows a summary of parameters for tone distribution design under the second option for BW20, Part (B) of FIG. 8 shows an alternative example of parameters for tone distribution design under the second option for BW20. Part (C) of FIG. 8 shows a summary of parameters for tone distribution design under the second option for BW40. FIG. 9 illustrates an example scenario 900 under the proposed scheme. Specifically, FIG. 9 shows a summary of parameters for tone distribution design under the second option for BW80. FIG. 10A, FIG. 10B, FIG. 100 and FIG. 10D each illustrates an alternative example scenarios 1000A, 1000B, 1000C and 1000D under the proposed scheme, respectively. Specifically, each of FIG. 10A, FIG. 10B, FIG. 100 and FIG. 10D shows a respective summary of parameters for tone distribution design under the second option for BW80. FIG. 11 illustrates an example scenario 1100 under the proposed scheme. Specifically, FIG. 11 shows a summary of parameters for tone distribution design under the second option for BW160. FIG. 12 illustrates an example scenario 1200 under the proposed scheme. Specifically, FIG. 12 shows a summary of parameters for tone distribution design under the second option for BW320.

Under a proposed scheme in accordance with the present disclosure, alternative design methods and/or equations may be utilized to generate tone distributions. Under a first option (Option A) of the proposed scheme, assuming that tone distribution is applied on BW80, but not other bandwidths, for RU52, RU106, RU242 and RU484, then the tone distribution may be further simplified to achieve perfectly and evenly distributed tones based on an alternative formula, expressed as follows:

$$K_{td}=RU_{start}(r)+j*D_{td}$$

Here, j=0, 1, 2, . . . , $N_{st}$−1, and r=1, 2, 3, . . . , $N_{ru}$. Moreover, $D_{td}$ denotes a tone separation distance, $D_{td}$=16 for RU52, $D_{td}$=8 for RU106, $D_{td}$=4 for RU242, and $D_{td}$=2 for RU484. Furthermore, $RU_{start}$ may be the same as that shown in FIG. 6.

Similarly, under the first option of the proposed scheme, assuming that tone distribution is applied on BW160, but not other bandwidths, for RU106, RU242, RU484 and RU996, or that that tone distribution is applied on BW320, but not other bandwidths, for RU242, RU484 and RU996, then the alternative formula shown above may also be utilized to generate tone distributions. Specifically, for BW160, $D_{td}$=16 for RU106, $D_{td}$=8 for RU242, $D_{td}$=4 for RU484, and $D_{td}$=2 for RU996. Furthermore, for BW320, $D_{td}$=16 for RU242, $D_{td}$=8 for RU484, and $D_{td}$=4 for RU996. Moreover, $RU_{start}$ may be the same as that shown in FIG. 7.

Under the first option of the proposed scheme, in an event that additional small RUs on larger bandwidths are supported (e.g., RU26 on BW80, RU26 or RU52 on BW160), then two approaches may be applied. In a first approach, a larger $D_{td}$ may be used in the alternative formula shown above. For instance, $D_{td}$=32 may be used for RU26 distributed on BW80, but with limitation of up to 32 RU26's. Similarly, $D_{td}$=32 may be used for RU52 distributed on BW160 and for RU106 distributed on BW320, but without limitation. In a second approach, a smaller $D_{td}$ (e.g., $D_{td}$=16) may be used for small RUs (e.g., RU26, RU52 and RU106) on larger bandwidths. In such cases, the small RU may be distributed within a "segment" by using the following formula:

$$K_{td} = RU_{start}(r) + j*D_{td} + \left\lfloor \frac{RU_{start}(r)-1}{D_{td}} \right\rfloor * N_{seg}$$

Here, $N_{seg}$ denotes the frequency segment size which is defined with number of tones, $N_{seg}$=484 or 996.

Under a second option (Option B) of the proposed scheme, another alternative approach may be utilized to generate distributed-tone RUs by using the following formula:

$$K_{td} = RU_{start}(r) + j*D_{td} + \left\lfloor \frac{j}{N_{psf}} \right\rfloor * N_{tsf}$$

Here, j=0, 1, 2, . . . , $N_{st}$−1, r=1, 2, 3, . . . , $N_{ru}$, $N_{psf}$ denotes a periodicity of tone shift, and $N_{tsf}$ denotes a number of tones per shift. FIG. 13 illustrates an example scenario 1300 under the proposed scheme. Specifically, FIG. 13 shows a summary of parameters for tone distribution design under the second option for BW20, BW40 and BW80.

Illustrative Implementations

Figure 14:
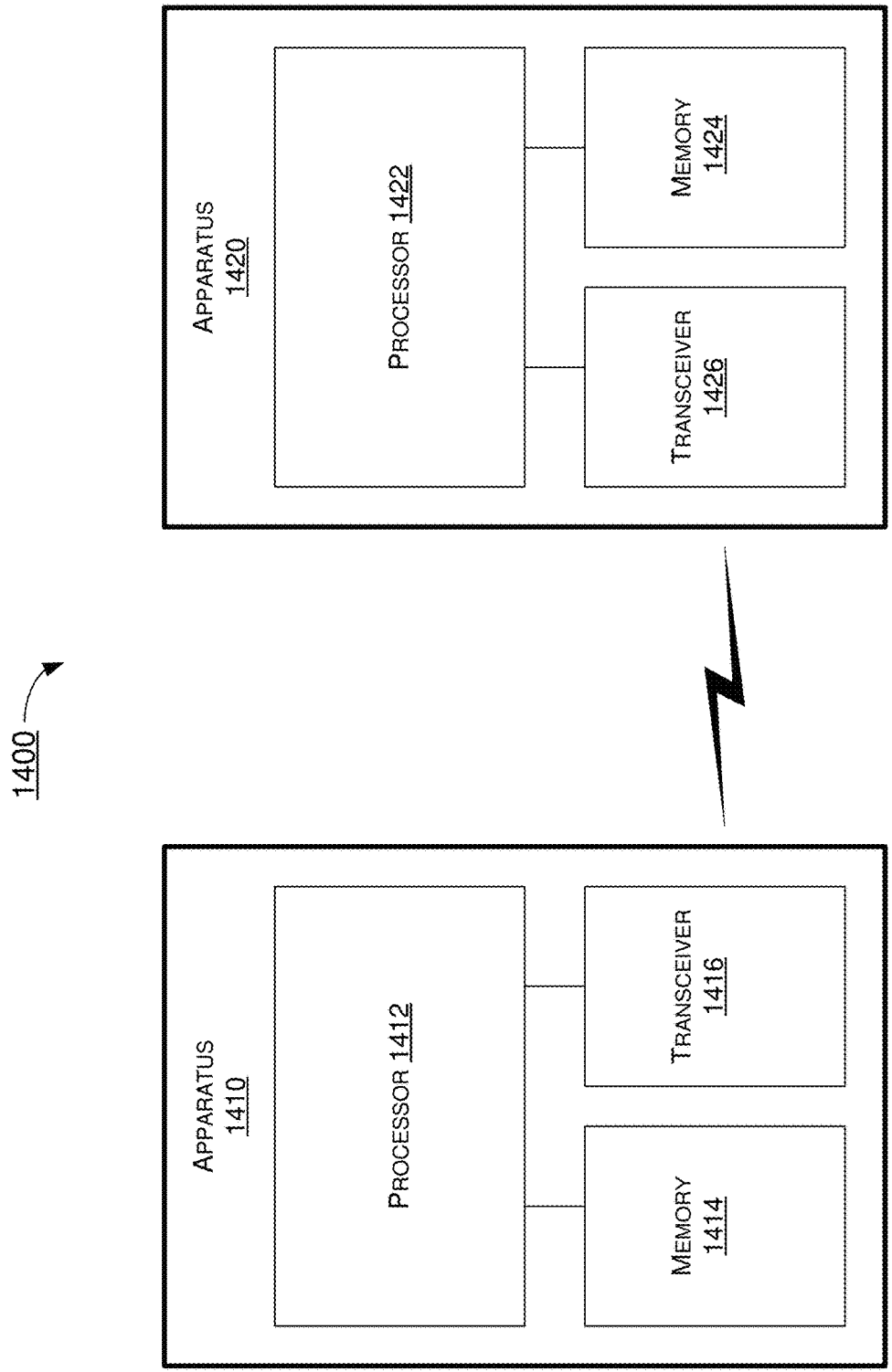
FIG. 14 is a block diagram of an example communication system in accordance with an implementation of the present disclosure.

FIG. 14 illustrates an example system 1400 having at least an example apparatus 1410 and an example apparatus 1420 in accordance with an implementation of the present disclosure. Each of apparatus 1410 and apparatus 1420 may perform various functions to implement schemes, techniques, processes and methods described herein pertaining to design simplification for distributed-tone RUs in 6 GHz LPI systems, including the various schemes described above with respect to various proposed designs, concepts, schemes, systems and methods described above as well as processes described below. For instance, apparatus 1410 may be an example implementation of communication entity 110, and apparatus 1420 may be an example implementation of communication entity 120.

Each of apparatus 1410 and apparatus 1420 may be a part of an electronic apparatus, which may be a STA or an AP, such as a portable or mobile apparatus, a wearable apparatus, a wireless communication apparatus or a computing apparatus. For instance, each of apparatus 1410 and apparatus 1420 may be implemented in a smartphone, a smart watch, a personal digital assistant, a digital camera, or a computing equipment such as a tablet computer, a laptop computer or a notebook computer. Each of apparatus 1410 and apparatus 1420 may also be a part of a machine type apparatus, which may be an IoT apparatus such as an immobile or a stationary apparatus, a home apparatus, a wire communication apparatus or a computing apparatus. For instance, each of apparatus 1410 and apparatus 1420 may be implemented in a smart thermostat, a smart fridge, a smart door lock, a wireless speaker or a home control center. When implemented in or as a network apparatus, apparatus 1410 and/or apparatus 1420 may be implemented in a network node, such as an AP in a WLAN.

In some implementations, each of apparatus 1410 and apparatus 1420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1410 and apparatus 1420 may be implemented in or as a STA or an AP. Each of apparatus 1410 and apparatus 1420 may include at least some of those components shown in FIG. 14 such as a processor 1412 and a processor 1422, respectively, for example. Each of apparatus 1410 and apparatus 1420 may further include one or more other components not pertinent to the proposed scheme of the present disclosure (e.g., internal power supply, display device and/or user interface device), and, thus, such component(s) of apparatus 1410 and apparatus 1420 are neither shown in FIG. 14 nor described below in the interest of simplicity and brevity.

In one aspect, each of processor 1412 and processor 1422 may be implemented in the form of one or more single-core processors, one or more multi-core processors, one or more RISC processors or one or more CISC processors. That is, even though a singular term "a processor" is used herein to refer to processor 1412 and processor 1422, each of processor 1412 and processor 1422 may include multiple processors in some implementations and a single processor in other implementations in accordance with the present disclosure. In another aspect, each of processor 1412 and processor 1422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1412 and processor 1422 is a special-purpose machine specifically designed, arranged and configured to perform specific tasks including those pertaining to design simplification for distributed-tone RUs in 6

GHz LPI systems in accordance with various implementations of the present disclosure. For instance, each of processor 1412 and processor 1422 may be configured with hardware components, or circuitry, implementing one, some or all of the examples described and illustrated herein.

In some implementations, apparatus 1410 may also include a transceiver 1416 coupled to processor 1412. Transceiver 1416 may be capable of wirelessly transmitting and receiving data. In some implementations, apparatus 1420 may also include a transceiver 1426 coupled to processor 1422. Transceiver 1426 may include a transceiver capable of wirelessly transmitting and receiving data.

In some implementations, apparatus 1410 may further include a memory 1414 coupled to processor 1412 and capable of being accessed by processor 1412 and storing data therein. In some implementations, apparatus 1420 may further include a memory 1424 coupled to processor 1422 and capable of being accessed by processor 1422 and storing data therein. Each of memory 1414 and memory 1424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1414 and memory 1424 may include a type of read-only memory (ROM) such as mask ROM, programmable ROM (PROM), erasable programmable ROM (EPROM) and/or electrically erasable programmable ROM (EEPROM). Alternatively, or additionally, each of memory 1414 and memory 1424 may include a type of non-volatile random-access memory (NVRAM) such as flash memory, solid-state memory, ferroelectric RAM (FeRAM), magnetoresistive RAM (MRAM) and/or phase-change memory.

Each of apparatus 1410 and apparatus 1420 may be a communication entity capable of communicating with each other using various proposed schemes in accordance with the present disclosure. For illustrative purposes and without limitation, a description of capabilities of apparatus 1410, as communication entity 110, and apparatus 1420, as communication entity 120, is provided below. It is noteworthy that, although the example implementations described below are provided in the context of WLAN, the same may be implemented in other types of networks. Thus, although the following description of example implementations pertains to a scenario in which apparatus 1410 functions as a transmitting device and apparatus 1420 functions as a receiving device, the same is also applicable to another scenario in which apparatus 1410 functions as a receiving device and apparatus 1420 functions as a transmitting device.

Under a proposed scheme in accordance with the present disclosure with respect to design simplification for distributed-tone RUs in 6 GHz LPI systems, processor 1412 of apparatus 1410 may perform tone distribution with a logical RU and MRU size over a bandwidth to generate a distributed-tone RU and a distributed-tone MRU. Additionally, processor 1412 may communicate wirelessly, via transceiver 1416, with apparatus 1420 using the distributed-tone RU and the distributed-tone MRU in a 6 GHz LPI system.

In some implementations, in performing the tone distribution, processor 1412 may generate the distributed-tone RU by applying a shift to a base tone set and generate the distributed-tone MRU from corresponding distributed-tone RUs. In some implementations, generation of the distributed-tone RU may be expressed as: $K_{td} = k_{td\_base}(k) \, k_{shift}(r)$. In such cases, r may denote a logical RU index, r=1, 2, 3, . . . , $N_{ru}$; k may denote a subcarrier index, k=0, 1, 2, . . . $N_{st}$; $N_{ru}$ may denote a number of logical RUs of the logical RU size within the bandwidth; $N_{st}$ may denote a total number of subcarriers including both data tones and pilot tones corresponding to the logical RU size; $k_{td\_base}$ may denote a base tone set corresponding to the bandwidth and the logical RU size; $k_{shift}$ may denote a shifting value or vector; and $K_{td}$ may denote a subcarrier index after the tone distribution.

In some implementations, in performing the tone distribution, processor 1412 may perform the tone distribution with the logical RU and MRU size being limited to a size equal to or less than 484 tones with the bandwidth being limited up to 80 MHz.

In some implementations, in performing the tone distribution, processor 1412 may perform the tone distribution with the logical RU and MRU size being limited to 52, 106, 242 and 484 tones with the distribution bandwidth being 80 MHz.

In some implementations, in performing the tone distribution, processor 1412 may perform the tone distribution with the logical RU and MRU size being limited to 26, 52 and 106 tones with a distribution bandwidth being 20 MHz, 26, 52, 106 and 242 tones with the distribution bandwidth being 40 MHz, and 52, 106, 242 and 484 tones with the distribution bandwidth being 80 MHz.

In some implementations, in performing the tone distribution, processor 1412 may perform the tone distribution with the logical RU and MRU size being limited to 26, 52, 78(52+26), 106, 132(106+26), 242 and 484 tones with the distribution bandwidth being 80 MHz.

In some implementations, in performing the tone distribution, processor 1412 may perform the tone distribution with the logical RU and MRU size being limited to a size equal to or less than 484 tones with the bandwidth being limited up to 160 MHz.

In some implementations, in performing the tone distribution, processor 1412 may perform the tone distribution with the logical RU and MRU size being limited to a size equal to or less than 996 tones with the bandwidth being limited up to 320 MHz.

In some implementations, generation of the distributed-tone RU may be expressed as: $K_{td}(k) = RU_{start}(r) + l_i + j*N_p$. In such cases, $RU_{start}(r)$ may denote a first or starting tone index for the distributed-tone RU; $N_p$ may denote a periodicity; i=0, 1, 2, . . . , L−1; j=0, 1, 2, . . . , $$\left\lceil \frac{N_{st\_ru}}{L} \right\rceil - 1;$$

k=0, 1, 2, . . . , $N_{st\_ru}$−1; r may denote a logical RU index, with r=1, 2, . . . , $N_{ru}$; $l_i$ may denote a tone distribution pattern during the periodicity, with $l_i \in \Omega_{ru} = \{l_0, l_1, \ldots, l_{L-1}\}$; L may denote a number of tones within one repetition distance or one repetition period, with L=|$\Omega_{ru}$|; $N_{ru}$ may denote a number of logical RUs of the logical RU size within the bandwidth; and $N_{st\_ru}$ may denote a number of subcarriers for the distributed-tone RU, with $N_{st\_ru}$=26, 52, 106, 242, 484, 996 for a 26-tone RU, a 52-tone RU, a 106-tone RU, a 242-tone RU, a 484-tone RU and a 996-tone RU, respectively. In such cases, the distributed-tone MRU may be generated from corresponding distributed-tone RUs.

In some implementations, generation of the distributed-tone RU may be expressed as: $K_{td} = RU_{start}(r) + j*D_{td}$. In such cases, $RU_{start}(r)$ may denote a first or starting tone index for the distributed-tone RU; j=0, 1, 2, . . . , $N_{st}$−1; r may denote a logical RU index, with r=1, 2, 3, . . . , $N_{ru}$; $D_{td}$ may denote a tone separation distance; $N_{ru}$ may denote a number of logical RUs of the logical RU size within the bandwidth; and $N_{st}$ may denote a total number of subcarriers including both data tones and pilot tones corresponding to the logical RU size.

In some implementations, generation of the distributed-tone RU may be expressed as:

$$K_{td} = RU_{start}(r) + j*D_{td} + \left\lfloor \frac{RU_{start}(r) - 1}{D_{td}} \right\rfloor * N_{seg}.$$

In such cases, $RU_{start}(r)$ may denote a first or starting tone index for the distributed-tone RU; $j=0, 1, 2, \ldots, N_{st}-1$; r may denote a logical RU index, with $r=1, 2, 3, \ldots, N_{ru}$; $D_{td}$ may denote a tone separation distance; $N_{ru}$ may denote a number of logical RUs of the logical RU size within the bandwidth; $N_{st}$ may denote a total number of subcarriers including both data tones and pilot tones corresponding to the logical RU size; and $N_{seg}$ may denote a frequency segment size, with $N_{seg}=484$ or 996.

In some implementations, generation of the distributed-tone RU may be expressed as:

$$K_{td} = RU_{start}(r) + j*D_{td} + \left\lfloor \frac{j}{N_{psf}} \right\rfloor * N_{tsf}.$$

In such cases, $RU_{start}(r)$ may denote a first or starting tone index for the distributed-tone RU; $j=0, 1, 2, \ldots, N_{st}-1$; r may denote a logical RU index, with $r=1, 2, 3, \ldots, N_{ru}$; $D_{td}$ may denote a tone separation distance; $N_{ru}$ may denote a number of logical RUs of the logical RU size within the bandwidth; $N_{st}$ may denote a total number of subcarriers including both data tones and pilot tones corresponding to the logical RU size; $N_{psf}$ may denote a periodicity of tone shift; and $N_{tsf}$ may denote a number of tones per shift.

Illustrative Processes

Figure 15:
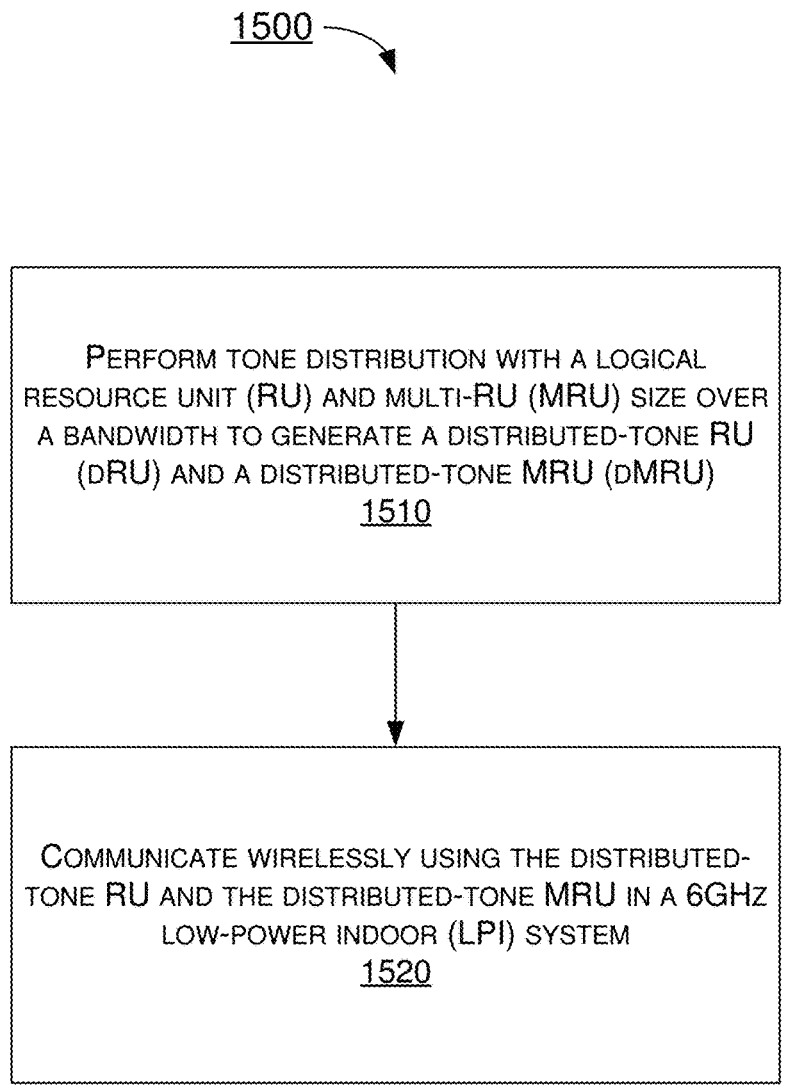
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to design simplification for distributed-tone RUs in 6 GHz LPI systems in accordance with the present disclosure. Process 1500 may include one or more operations, actions, or functions as illustrated by one or more of blocks 1510 and 1520. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1410 and apparatus 1420 as well as any variations thereof. Solely for illustrative purposes and without limiting the scope, process 1500 is described below in the context of apparatus 1410 as communication entity 110 (e.g., a transmitting device whether a STA or an AP) and apparatus 1420 as communication entity 120 (e.g., a receiving device whether a STA or an AP) of a wireless network such as a WLAN in accordance with one or more of IEEE 802.11 standards. Process 1500 may begin at block 1510.

At 1510, process 1500 may involve processor 1412 of apparatus 1410 performing tone distribution with a logical RU and MRU size over a bandwidth to generate a distributed-tone RU and a distributed-tone MRU. Process 1500 may proceed from 1510 to 1520.

At 1520, process 1500 may involve processor 1412 communicating wirelessly, via transceiver 1416, with apparatus 1420 using the distributed-tone RU and the distributed-tone MRU in a 6 GHz LPI system.

In some implementations, in performing the tone distribution, process 1500 may involve processor 1412 generating the distributed-tone RU by applying a shift to a base tone set as well as generating the distributed-tone MRU from corresponding distributed-tone RUs. In some implementations, generation of the distributed-tone RU may be expressed as: $K_{td}=k_{td\_base}(k)+k_{shift}(r)$. In such cases, r may denote a logical RU index, $r=1, 2, 3, \ldots, N_{ru}$; k may denote a subcarrier index, $k=0, 1, 2, \ldots N_{st}$; $N_{ru}$ may denote a number of logical RUs of the logical RU size within the bandwidth; $N_{st}$ may denote a total number of subcarriers including both data tones and pilot tones corresponding to the logical RU size; $k_{td\_base}$ may denote a base tone set corresponding to the bandwidth and the logical RU size; $k_{shift}$ may denote a shifting value or vector; and $K_{td}$ may denote a subcarrier index after the tone distribution.

In some implementations, in performing the tone distribution, process 1500 may involve processor 1412 performing the tone distribution with the logical RU and MRU size being limited to a size equal to or less than 484 tones with the bandwidth being limited up to 80 MHz.

In some implementations, in performing the tone distribution, process 1500 may involve processor 1412 performing the tone distribution with the logical RU and MRU size being limited to 52, 106, 242 and 484 tones with the bandwidth being 80 MHz.

In some implementations, in performing the tone distribution, process 1500 may involve processor 1412 performing the tone distribution with the logical RU and MRU size being limited to 26, 52 and 106 tones with a distribution bandwidth being 20 MHz, 26, 52, 106 and 242 tones with the distribution bandwidth being 40 MHz, and 52, 106, 242 and 484 tones with the distribution bandwidth being 80 MHz.

In some implementations, in performing the tone distribution, process 1500 may involve processor 1412 performing the tone distribution with the logical RU and MRU size being limited to 26, 52, 78(52+26), 106, 132(106+26), 242 and 484 tones with the distribution bandwidth being 80 MHz.

In some implementations, in performing the tone distribution, process 1500 may involve processor 1412 performing the tone distribution with the logical RU and MRU size being limited to a size equal to or less than 484 tones with the distribution bandwidth being limited up to 160 MHz.

In some implementations, in performing the tone distribution, process 1500 may involve processor 1412 performing the tone distribution with the logical RU and MRU size being limited to a size equal to or less than 996 tones with the bandwidth being limited up to 320 MHz.

In some implementations, generation of the distributed-tone RU may be expressed as: $K_{td}(k)=RU_{start}(r)+l_i+j*N_p$. In such cases, $RU_{start}(r)$ may denote a first or starting tone index for the distributed-tone RU; $N_p$ may denote a periodicity; $i=0, 1, 2, \ldots, L-1$; $j=0, 1, 2, \ldots$ $$\left\lceil \frac{N_{st\_ru}}{L} \right\rceil - 1;$$

k=0, 1, 2, . . . , $N_{st\_ru}$-1; r may denote a logical RU index, with r=1, 2, . . . , $N_{ru}$; $l_t$ may denote a tone distribution pattern during the periodicity, with $l_i \in \Omega_{ru} = \{l_0, l_1, \ldots, l_{L-1}\}$; L may denote a number of tones within one repetition distance or one repetition period, with L=$|\Omega_{ru}|$; $N_{ru}$ may denote a number of logical RUs of the logical RU size within the bandwidth; and $N_{st\_ru}$ may denote a number of subcarriers for the distributed-tone RU, with $N_{st\_ru}$=26, 52, 106, 242, 484, 996 for a 26-tone RU, a 52-tone RU, a 106-tone RU, a 242-tone RU, a 484-tone RU and a 996-tone RU, respectively. In such cases, the distributed-tone MRU may be generated from corresponding distributed-tone RUs.

In some implementations, generation of the distributed-tone RU may be expressed as: $K_{td}=RU_{start}(r)+j*D_{td}$. In such cases, $RU_{start}(r)$ may denote a first or starting tone index for the distributed-tone RU; j=0, 1, 2, . . . , $N_{st}$-1; r may denote a logical RU index, with r=1, 2, 3, . . . , $N_{ru}$; $D_{td}$ may denote a tone separation distance; $N_{ru}$ may denote a number of logical RUs of the logical RU size within the bandwidth; and $N_{st}$ may denote a total number of subcarriers including both data tones and pilot tones corresponding to the logical RU size.

In some implementations, generation of the distributed-tone RU may be expressed as:

$$K_{td} = RU_{start}(r) + j*D_{td} + \left\lfloor \frac{RU_{start}(r)-1}{D_{td}} \right\rfloor * N_{seg}.$$

In such cases, $RU_{start}(r)$ may denote a first or starting tone index for the distributed-tone RU; j=0, 1, 2, . . . , $N_{st}$-1; r may denote a logical RU index, with r=1, 2, 3, . . . , $N_{ru}$; $D_{td}$ may denote a tone separation distance; $N_{ru}$ may denote a number of logical RUs of the logical RU size within the bandwidth; $N_{st}$ may denote a total number of subcarriers including both data tones and pilot tones corresponding to the logical RU size; and $N_{seg}$ may denote a frequency segment size, with $N_{seg}$=484 or 996.

In some implementations, generation of the distributed-tone RU may be expressed as:

$$K_{td} = RU_{start}(r) + j*D_{td} + \left\lfloor \frac{j}{N_{psf}} \right\rfloor * N_{tsf}.$$

In such cases, $RU_{start}(r)$ may denote a first or starting tone index for the distributed-tone RU; j=0, 1, 2, . . . , $N_{st}$-1; r may denote a logical RU index, with r=1, 2, 3, . . . , $N_{ru}$; $D_{td}$ may denote a tone separation distance; $N_{ru}$ may denote a number of logical RUs of the logical RU size within the bandwidth; $N_{st}$ may denote a total number of subcarriers including both data tones and pilot tones corresponding to the logical RU size; $N_{psf}$ may denote a periodicity of tone shift; and $N_{tsf}$ may denote a number of tones per shift.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing tone distribution with a logical resource unit (RU) and multi-RU (MRU) size over a bandwidth to generate a distributed-tone RU (dRU) and a distributed-tone MRU (dMRU); and
communicating wirelessly using the distributed-tone RU and the distributed-tone MRU in a 6 GHz low-power indoor (LPI) system,
wherein the generating of the distributed-tone RU is influenced by at least a number of logical RUs of the logical RU size within the bandwidth and a total number of subcarriers including both data tones and pilot tones corresponding to the logical RU size.

2. The method of claim 1, wherein the performing of the tone distribution comprises:
generating the distributed-tone RU by applying a shift to a base tone set; and
generating the distributed-tone MRU from corresponding distributed-tone RUs.

3. The method of claim 2, wherein the generating of the distributed-tone RU is expressed as:

$$K_{td}=k_{td\_base}(k)+k_{shift}(r), \text{ and}$$

wherein:
r denotes a logical RU index, r=1, 2, 3, ..., $N_{ru}$,
k denotes a subcarrier index, k=0, 1, 2, ... $N_{st}$,
$N_{ru}$ denotes the number of logical RUs of the logical RU size within the bandwidth,
$N_{st}$ denotes the total number of subcarriers including both data tones and pilot tones corresponding to the logical RU size,
$k_{td\_base}$ denotes a base tone set corresponding to the bandwidth and the logical RU size,
$k_{shift}$ denotes a shifting value or vector, and
$K_{td}$ denotes a subcarrier index after the tone distribution.

4. The method of claim 1, wherein the performing of the tone distribution comprises performing the tone distribution with the logical RU and MRU size being limited to a size equal to or less than 484 tones with the bandwidth being limited up to 80 MHz.

5. The method of claim 1, wherein the performing of the tone distribution comprises performing the tone distribution with the logical RU and MRU size being limited to 52, 106, 242 and 484 tones with the bandwidth being 80 MHz.

6. The method of claim 1, wherein the performing of the tone distribution comprises performing the tone distribution with the logical RU and MRU size being limited to:
26, 52 and 106 tones with a distribution bandwidth being 20 MHz,
26, 52, 106 and 242 tones with the distribution bandwidth being 40 MHz, and
52, 106, 242 and 484 tones with the distribution bandwidth being 80 MHz.

7. The method of claim 1, wherein the performing of the tone distribution comprises performing the tone distribution with the logical RU and MRU size being limited to 26, 52, 78(52+26), 106, 132(106+26), 242 and 484 tones with the distribution bandwidth being 80 MHz.

8. The method of claim 1, wherein the performing of the tone distribution comprises performing the tone distribution with the logical RU and MRU size being limited to a size equal to or less than 484 tones with the distribution bandwidth being limited up to 160 MHz.

9. The method of claim 1, wherein the performing of the tone distribution comprises performing the tone distribution with the logical RU and MRU size being limited to a size equal to or less than 996 tones with the bandwidth being limited up to 320 MHz.

10. The method of claim 1, wherein the generating of the distributed-tone RU is expressed as:

$$K_{td}(k)=RU_{start}(r)+l_i+j*N_p, \text{ and}$$

wherein:
$RU_{start}(r)$ denotes a first or starting tone index for the distributed-tone RU,
$N_p$ denotes a periodicity,
i=0, 1, 2, ..., L−1,
j=0, 1, 2, ..., $$\left\lceil \frac{N_{st\_ru}}{L} \right\rceil - 1,$$

k=0, 1, 2, ..., $N_{st\_ru}$−1,
r denotes a logical RU index, with r=1, 2, ..., $N_{ru}$,
$l_i$ denotes a tone distribution pattern during the periodicity, with $l_i \in \Omega_{ru}=\{l_0, l_1, ..., l_{L-1}\}$,
L denotes a number of tones within one repetition distance or one repetition period, with L=|$\Omega_{ru}$|,
$N_{ru}$ denotes the number of logical RUs of the logical RU size within the bandwidth,
$N_{st\_ru}$ denotes a number of subcarriers for the distributed-tone RU, with $N_{st\_ru}$=26, 52, 106, 242, 484, 996 for a 26-tone RU, a 52-tone RU, a 106-tone RU, a 242-tone RU, a 484-tone RU and a 996-tone RU, respectively, and
the distributed-tone MRU is generated from corresponding distributed-tone RUs.

11. The method of claim 1, wherein the generating of the distributed-tone RU is expressed as:

$$K_{td}=RU_{start}(r)+j*D_{td}, \text{ and}$$

wherein:
$RU_{start}(r)$ denotes a first or starting tone index for the distributed-tone RU,
j=0, 1, 2, ..., $N_{st}$−1,
r denotes a logical RU index, with r=1, 2, 3, ..., $N_{ru}$,
$D_{td}$ denotes a tone separation distance,
$N_{ru}$ denotes the number of logical RUs of the logical RU size within the bandwidth, and
$N_{st}$ denotes the total number of subcarriers including both data tones and pilot tones corresponding to the logical RU size.

12. The method of claim 1, wherein the generating of the distributed-tone RU is expressed as:

$$K_{td} = RU_{start}(r) + j*D_{td} + \left\lfloor \frac{RU_{start}(r)-1}{D_{td}} \right\rfloor * N_{seg},$$

and wherein:
RU$_{start}$(r) denotes a first or starting tone index for the distributed-tone RU,
j=0, 1, 2, ..., N$_{st}$−1,
r denotes a logical RU index, with r=1, 2, 3, ..., N$_{ru}$,
D$_{td}$ denotes a tone separation distance,
N$_{ru}$ denotes the number of logical RUs of the logical RU size within the bandwidth,
N$_{st}$ denotes the total number of subcarriers including both data tones and pilot tones corresponding to the logical RU size, and
N$_{seg}$ denotes a frequency segment size, with N$_{seg}$=484 or 996.

13. The method of claim 1, wherein the generating of the distributed-tone RU is expressed as:

$$K_{td} = RU_{start}(r) + j*D_{td} + \left\lfloor \frac{j}{N_{psf}} \right\rfloor * N_{tsf},$$

and
wherein:
RU$_{start}$(r) denotes a first or starting tone index for the distributed-tone RU,
j=0, 1, 2, ..., N$_{st}$−1,
r denotes a logical RU index, with r=1, 2, 3, ..., N$_{ru}$,
D$_{td}$ denotes a tone separation distance,
N$_{ru}$ denotes the number of logical RUs of the logical RU size within the bandwidth,
N$_{st}$ denotes the total number of subcarriers including both data tones and pilot tones corresponding to the logical RU size,
N$_{psf}$ denotes a periodicity of tone shift, and
N$_{tsf}$ denotes a number of tones per shift.

14. An apparatus, comprising:
a transceiver configured to communicate wirelessly; and
a processor coupled to the transceiver and configured to perform operations comprising:
performing tone distribution with a logical resource unit (RU) and multi-RU (MRU) size over a bandwidth to generate a distributed-tone RU (dRU) and a distributed-tone MRU (dMRU); and
communicating, via the transceiver, using the distributed-tone RU and MRU in a 6 GHz low-power indoor (LPI) system,
wherein the generating of the distributed-tone RU is influenced by at least a number of logical RUs of the logical RU size within the bandwidth and a total number of subcarriers including both data tones and pilot tones corresponding to the logical RU size.

15. The apparatus of claim 14, wherein, in performing the tone distribution, the processor is configured to perform operations comprising:
generating the distributed-tone RU by applying a shift to a base tone set; and
generating the distributed-tone MRU from corresponding distributed-tone RUs.

16. The apparatus of claim 15, wherein generation of the distributed-tone RU is expressed as:

$$K_{td}=k_{td\_base}(k)+k_{shift}(r), \text{ and}$$

wherein:
r denotes a logical RU index, r=1, 2, 3, ..., N$_{ru}$,
k denotes a subcarrier index, k=0, 1, 2, ... N$_{st}$,
N$_{ru}$ denotes the number of logical RUs of the logical RU size within the bandwidth,
N$_{st}$ denotes the total number of subcarriers including both data tones and pilot tones corresponding to the logical RU size,
k$_{td\_base}$ denotes a base tone set corresponding to the bandwidth and the logical RU size,
k$_{shift}$ denotes a shifting value or vector, and
K$_{td}$ denotes a subcarrier index after the tone distribution.

17. The apparatus of claim 14, wherein, in performing the tone distribution, the processor is configured to perform the tone distribution with the logical RU and MRU size being limited to a size equal to or less than 484 tones and with the bandwidth being limited up to 80 MHz.

18. The apparatus of claim 14, wherein, in performing the tone distribution, the processor is configured to perform the tone distribution with the logical RU and MRU size being limited to:
26, 52 and 106 tones with a distribution bandwidth being 20 MHz,
26, 52, 106 and 242 tones with the distribution bandwidth being 40 MHz, and
52, 106, 242 and 484 tones with the distribution bandwidth being 80 MHz.

19. The apparatus of claim 14, wherein generation of the distributed-tone RU is expressed as:

$$K_{td}(k)=RU_{start}(r)++j*N_p, \text{ and}$$

wherein:
RU$_{start}$(r) denotes a first or starting tone index for the distributed-tone RU,
N$_p$ denotes a periodicity,
i=0, 1, 2, ..., L−1,
j=0, 1, 2, ..., $$\left\lceil \frac{N_{st\_ru}}{L} \right\rceil - 1,$$

k=0, 1, 2, ..., N$_{st\_ru}$−1,
r denotes a logical RU index, with r=1, 2, ..., N$_{ru}$,
l$_i$ denotes a tone distribution pattern during the periodicity, with l$_i$∈Ω$_{ru}$={l$_0$, l$_1$, ..., l$_{L-1}$},
L denotes a number of tones within one repetition distance or one repetition period, with L=|Ω$_{ru}$|,
N$_{ru}$ denotes the number of logical RUs of the logical RU size within the bandwidth,
N$_{st\_ru}$ denotes a number of subcarriers for the distributed-tone RU, with N$_{st\_ru}$=26, 52, 106, 242, 484, 996 for a 26-tone RU, a 52-tone RU, a 106-tone RU, a 242-tone RU, a 484-tone RU and a 996-tone RU, respectively, and
the distributed-tone MRU is generated from corresponding distributed-tone RUs.

20. The apparatus of claim 14, wherein generation of the distributed-tone RU is expressed as one of:

$$K_{td} = RU_{start}(r) + j*D_{td},$$

$$K_{td} = RU_{start}(r) + j*D_{td} + \left\lfloor \frac{RU_{start}(r) - 1}{D_{td}} \right\rfloor * N_{seg}, \text{ or}$$

$$K_{td} = RU_{start}(r) + j*D_{td} + \left\lfloor \frac{j}{N_{psf}} \right\rfloor * N_{tsf},$$

and wherein:
- $RU_{start}(r)$ denotes a first or starting tone index for the distributed-tone RU,
- $j=0, 1, 2, \ldots, N_{st}-1$,
- r denotes a logical RU index, with $r=1, 2, 3, \ldots, N_{ru}$,
- $D_{td}$ denotes a tone separation distance,
- $N_{ru}$ denotes the number of logical RUs of the logical RU size within the bandwidth,
- $N_{st}$ denotes the total number of subcarriers including both data tones and pilot tones corresponding to the logical RU size,
- $N_{seg}$ denotes a frequency segment size, with $N_{seg}=484$ or 996,
- $N_{psf}$ denotes a periodicity of tone shift, and
- $N_{tsf}$ denotes a number of tones per shift.

* * * * *